Figure 1:
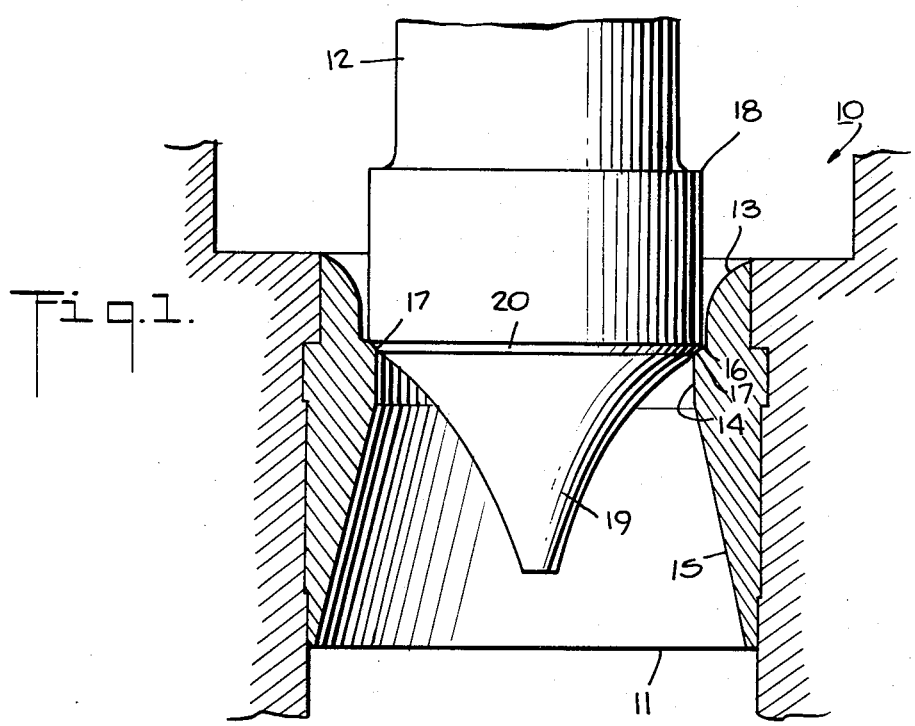

United States Patent
Illing

[15] 3,703,273
[45] Nov. 21, 1972

[54] LOW LOSS INNERVALVE ASSEMBLY
[72] Inventor: Henry Illing, Parksville, N.Y.
[73] Assignee: Kieley & Mueller, Inc., Middletown, N.Y.
[22] Filed: Aug. 24, 1970
[21] Appl. No.: 66,167

[52] U.S. Cl. .................................. 251/122, 138/46
[51] Int. Cl. .............................................. F16k 47/00
[58] Field of Search ......... 251/121, 122, 333; 138/46

[56] References Cited

UNITED STATES PATENTS

| 2,087,621 | 7/1937 | Lorraine | 251/124 |
| 3,074,685 | 1/1963 | Eckert et al. | 137/219 X |
| 2,061,852 | 11/1936 | Schweitzer | 251/122 |
| 2,590,318 | 3/1952 | Hollis | 251/121 |
| 3,317,184 | 5/1967 | Usry | 251/122 |

FOREIGN PATENTS OR APPLICATIONS

| 1,248,029 | 10/1960 | France | 251/333 |
| 967,299 | 3/1950 | France | 251/122 |

Primary Examiner—Henry T. Klinksiek
Attorney—Kenyon & Kenyon Reilly Carr & Chapin

[57] ABSTRACT

The seat ring is formed with a bellmouth inlet while the innervalve can be tapered, flat or curved. The bellmouth shaped inlet allows a high flow rate to be obtained with energy losses and noise reduced to a minimum. The inlet can be slightly modified to change the valve characteristic without effecting efficiency to any significant degree.

11 Claims, 2 Drawing Figures

PATENTED NOV 21 1972 3,703,273

INVENTOR.
HENRY ILLING
BY
Kenyon & Kenyon Reilly Carr & Chapin
ATTORNEYS

LOW LOSS INNERVALVE ASSEMBLY

This invention relates to a valve. More particularly, this invention relates to an innervalve assembly for a valve.

It has been known to construct valves for controlling the flow of various fluids in a manner so as to obtain high flow rates and low noise level. For example, various types of valves, such as globe valves and needle valves, have been constructed with innervalves and corresponding seats which regulate the volume of flow by means of a regulation of the clearance between the innervalve and the seat. However, while these valves in some cases have been able to achieve high flow rates, such has been accompanied by an increase in energy and pressure losses. Also, relatively high noise levels have been produced in some instances.

In order to overcome these above problems, the innervalves and valve seats have been contoured to produce a more efficient flow stream. For example, it has been known to provide a valve seat with an orifice having a sharp edge while the innervalve has been shaped to obtain a desired valve characteristic. However, such a valve experiences a high loss from stream contraction and turbulence downstream of the orifice. Other valves have also been known wherein seat rings have been contoured to a curvilinear shape to cooperate with various shaped innervalves. For example, it has been known to incorporate a curvilinear surface on both innervalve and seat ring to provide for sealing contact when the valve is in a closed position regardless of any misalignment or wear. In other cases, valves have been known which utilize conical surfaces with different tapered ends on both the innervalve and seat ring to provide for an improved sealing or for flow control. Other valves have been known to produce a streamline flow utilizing a teardrop shape innervalve while others utilize a flexible seat of different contours in order to reduce deformation and maintain seat tightness.

Accordingly, it is an object of this invention to obtain a high flow rate and low noise level in a valve by reducing energy and pressure forces to a minimum while maintaining a desired valve characteristic.

It is another object of the invention to prevent contraction and separated flow while reducing turbulence and energy loss and noise within a valve.

It is another object of the invention to reduce erosion within a valve.

It is another object of the invention to produce a valve with a relatively high flow capacity.

It is another object of the invention to obtain a desired valve characteristic without significantly changing the efficiency of a valve.

Briefly, the invention provides a valve in which the flow is controlled as a function of innervalve stroke. The valve includes a seat ring having a curvilinear-shaped inlet upstream of an orifice and a diffuser-shaped outlet as well as an innervalve which can be curved, conically tapered or flat. The inlet of the seat ring is configured in the general shape of a bellmouth so as to cooperate with the innervalve to produce a flow having a magnitude which is controlled as a function of the innervalve stroke.

It has been found that for any position of the innervalve, there is a minimum annulus between the innervalve and the seat ring which represents a maximum restriction through which a fluid flows. For a fixed pressure differential, as this annular area increases with increased stroke, the flow will increase in a predetermined manner, e.g. in a straight line, resulting from the relationship of the contour of the seat ring and the contour of the innervalve. It has also been found that the flow capacity Cv of the valve of the invention is greatly improved over other similar types of valves, especially those in which the innervalve has been contoured while the seat ring has been provided with a cylindrical bore.

Figure 2:
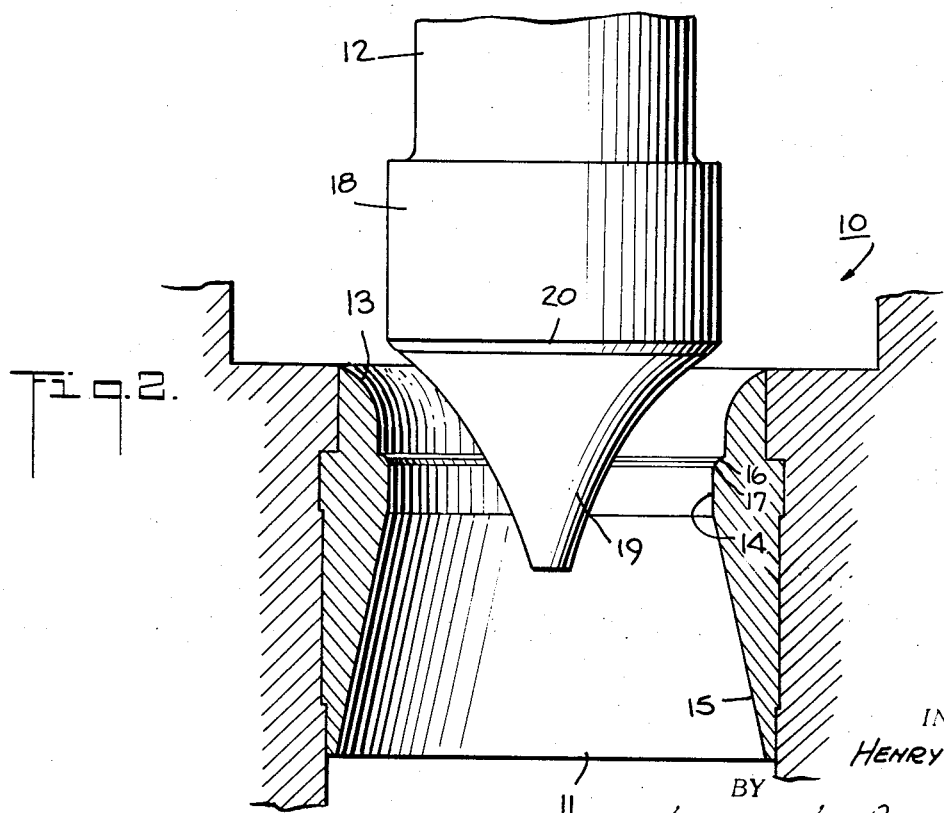

These and other objects and advantages of the invention will become more apparent from the following detailed description and appended claims taken in conjunction with the accompanying drawings in which:

FIG. 1 illustrates a part cross-sectional view of a valve seat ring and innervalve of a valve according to the invention in a closed position; and FIG. 2 illustrates a similar view of the seat ring and innervalve in an open position.

Referring to FIG. 1, wherein the parts of a valve 10 not necessary to the understanding of the invention have been omitted for sake of clarity, the valve 10 includes an innervalve assembly having a seat ring 11 and an innervalve 12. The seat ring 11 is fixedly mounted within the valve 10 while the innervalve 12 is mounted for reciprocating axially with respect to the seat ring 11.

Referring to FIG. 2, the seat ring 11 has a curvilinear inlet 13 substantially in the shape of a bellmouth, an orifice 14 of cylindrical shape and a diffuser-shaped outlet 15, as shown. In addition, a shoulder 16 is situated between the inlet 13 and orifice 14 to provide a clearance for the innervalve 12 and a tapered seating surface 17 is formed at the inner periphery of the shoulder 16.

The innervalve 12 has a cylindrically shaped head 18, a divergent diffuser section 19 at the lower end and a seating surface 20 which is located between the head 18 and divergent diffuser section 19. The seating surface 20 of the innervalve 12 is shaped and sized to cooperate with the seating surface 17 of the seat ring 11 in order to close off the flow of fluid through the orifice 14.

Both the seat ring 11 and innervalve 12 are made of materials which are rigid, so as to resist deformation, and noncorrosive materials, so as to reduce corrosion.

By way of example, for a seat ring 11 having an overall length of 5.375 inches and a diameter of 6.308 inches and an orifice opening of 4.625 inches, the bellmouth shaped inlet 13 has an opening which decreases in diameter from 5.937 inches to 4.800 inches at the shoulder 16, which is located 1.250 inches from the mount of the inlet. In addition, for each ¼ inch of depth the diameter decreases to 5.260 inches to 5.000 inches to 4.860 inches to 4.840 inches and finally to 4.800 inches at the shoulder 16. The change in slope at the bottom of the inlet serves to impart accuracy to the required flow characteristic. Further, the shoulder 16 is formed on a 1/32 inch radius while the seating surface 17 extends approximately 0.015 inches in depth along an angle of approximately 30° to the vertical or longitudinal axis of the ring 11 to the bore of the orifice 14 which is approximately ¾ of an inch in length. This seat ring 11 cooperates with an innervalve 12 having a head 18 of a diameter of 4.760 inches, a tapered seating surface 20 which tapers 30° from the vertical to a diameter of 4.609 inches and a divergent diffuser section 19 which extends downwardly.

The above mentioned dimensions for the seat ring 11 and innervalve 12 are given by way of example and are not limited thereto as other seat rings and innervalves can be dimensioned in accordance with the invention to obtain the high flow rate and low noise level characteristic of the invention. For example, the bellmouth shape of the inlet 13 of the seat ring 11 can be modified slightly from the relative dimensions exemplified above in order to give a desired valve characteristic. For example, while the shape of the curved inlet is substantially that of an ellipse to give an equal percent characteristic, the shape can also be represented by other conic sections such as a circle, parabola and hyperbola to produce other characteristics such as linear, modified linear, quick opening, and the like, with minimum sacrifice of efficiency.

It has been found that the flow capacity of a valve having an innervalve assembly according to the invention achieves a relatively high value. For example, as compared to an 8 by 4 inches Type 1452 valve as manufactured by Kieley & Mueller, Inc. which had a flow capacity $C_v$ of 87 (i.e. 87 gallons per minute for a 1 lb. per square inch pressure differential) a valve constructed in accordance with the invention, although having an orifice diameter of 4⅞ inches, had a flow capacity $C_v$ of 724. It is noted that the increase in diameter would increase the flow capacity $C_v$ in the order of about 1½ times 87. However, this calculated increase is negligible compared with the final valve of $C_v=724$ of the valve according to the invention.

The curvilinear surface of the inlet 13 in cooperation with the innervalve 12 controls the flow as a function of the stroke of the innervalve 12. In addition, the curvilinear surface of the inlet 13 serves to reduce flow turbulence so that a higher flow can be obtained. Also, contraction and separation of the flow are prevented so the energy loss and noise are reduced to a minimum.

This invention thus provides a valve which obtains a high flow rate and low noise level along with a reduction of energy and pressure losses. Also, the valve can be modified to any desired valve characteristic without sacrificing efficiency. It is noted that the bellmouth shaped inlet of the seat ring serves a double purpose in providing the desired characteristic while reducing losses and noise to a minimum.

The invention further provides a valve which exposes a relatively large surface area to a throttled stream so that erosion is reduced.

What is claimed is:

1. An innervalve assembly comprising
   a seat ring having a bellmouth shaped inlet, an elongated cylindrically shaped orifice downstream of said inlet, a shoulder between said inlet and said orifice and a venturi-shaped outlet downstream of said orifice; and
   an innervalve for seating within said seat ring to control a flow through said orifice as a function of the stroke of said innervalve relative to said seat ring while preventing contraction and separation of the flow, said innervalve having a lower surface for extending into said orifice to form an inner boundary for a flow through said inlet and a cylindrically shaped head upstream of said lower surface, said head being of a smaller diameter then said inlet to be spaced from said inlet and of a larger diameter than said orifice.

2. An innervalve assembly as set forth in claim 1 wherein said inlet has an opening which decreases in diameter at an increasing slope from the upstream end to a point spaced from said orifice and then decreases at a decreasing slope from said point to said shoulder.

3. An innervalve assembly as set forth in claim 1 wherein said seat ring includes a first seating surface between said shoulder and said orifice and said innervalve includes a second seating surface between said lower surface and said head for seating on said first seating surface.

4. An innervalve assembly as set forth in claim 1 wherein said lower surface is in the form of a divergent diffuser section.

5. An innervalve assembly as set forth in claim 4 wherein said bellmouth shaped inlet is of a shape substantially of an ellipse to give an equal percent characteristic.

6. An innervalve assembly comprising a seat ring having a bellmouth shaped inlet, an elongated cylindrical shaped orifice of less diameter than said inlet, a tapered seating surface at the inner periphery of said shoulder adjacent said orifice and an outlet downstream of said orifice; and an innervalve having a seating surface thereon for seating on said seating surface of said seat ring, a cylindrically shaped head upstream of said seating surface of said innervalve and a tapered lower surface of less diameter than said head for disposition within said inlet and said orifice, wherein said inlet and said innervalve control the flow of a fluid thereby as a function of the stroke of said innervalve while preventing contraction and separation of the flow in said inlet.

7. An innervalve as set forth in claim 6 wherein said outlet has a diffuser shape.

8. An innervalve as set forth in claim 7 wherein said seating surfaces are each disposed at an angle of 30° from the longitudinal axis of said ring.

9. An innervalve as set forth in claim 7 wherein said innervalve has a divergent diffuser section below said seating surface thereof.

10. An innervalve assembly as set forth in claim 6 wherein said bellmouth shaped inlet is of a shape substantially of an ellipse to give an equal percent characteristic.

11. An innervalve assembly as set forth in claim 6 wherein said inlet has an opening which decreases in diameter at an increasing slope from the upstream end to a point spaced from said orifice and then decreases at a decreasing slope from said point to said shoulder.

* * * * *